US005618570A

United States Patent [19]
Banks et al.

[11] Patent Number: 5,618,570
[45] Date of Patent: Apr. 8, 1997

[54] SYSTEM FOR THE PREPARATION OF COFFEE OR THE LIKE

[76] Inventors: Stephen H. Banks; Keiko S. Banks, both of 138 18th Ave., San Francisco, Calif. 94121

[21] Appl. No.: 533,065

[22] Filed: Sep. 25, 1995

[51] Int. Cl.$^6$ ............................. A47J 31/18; A23L 1/20
[52] U.S. Cl. ............................. 426/435; 99/287; 99/297
[58] Field of Search ............................. 99/297, 287, 279; 426/77, 112, 115, 433, 435

[56] References Cited

U.S. PATENT DOCUMENTS

| | | |
|---|---|---|
| 1,346,485 | 7/1920 | Arrigunaga . |
| 1,797,672 | 3/1931 | Paolini . |
| 2,211,486 | 8/1940 | Zoia ................................. 53/3 |
| 2,749,834 | 6/1956 | Hiscock ........................ 99/297 |
| 2,935,928 | 5/1960 | Keating ........................ 99/287 |
| 3,657,993 | 4/1972 | Close ........................ 99/297 |
| 3,927,608 | 12/1975 | Doyel ........................ 99/297 |
| 5,461,968 | 10/1995 | Portman ........................ 99/297 |
| 5,478,586 | 12/1995 | Connor ........................ 426/431 |

Primary Examiner—Robert W. Jenkins
Attorney, Agent, or Firm—Haverstock & Associates

[57] ABSTRACT

An improved device for the preparation of individual coffee or tea beverages. A cylindrical, parallel walled container acts as both a brewing container and a drinking container. A plunger assembly is pushed down through the top of the container and effectively separates coffee grounds or the like from the brewed drink. A finely perforated disk having an upwardly oriented flange, is attached to the underside of a rigid perforated disk of the plunger assembly by means of a ribbed tab located at the center of the rigid perforated disk. Frictional attachment is made by inserting the ribbed tab of the rigid, perforated disk into the slot of the finely perforated disk. When removing the plunger assembly, the finely perforated disk detaches from the plunger assembly and remains in the bottom portion of the container thereby trapping the coffee grounds or the like between the finely perforated disk and the bottom of the container. The remaining brewed beverage can be drunk by a person in a similar way to a normal coffee mug. Upon completion of the beverage, the finely perforated disk can be removed and reattached to the plunger assembly for reuse.

19 Claims, 6 Drawing Sheets

SYSTEM FOR THE PREPARATION OF COFFEE OR THE LIKE

BACKGROUND OF THE INVENTION

This invention relates to devices for the preparation of beverages, such as coffee of tea, and it has for its principal object the provision of an improved device of this character whereby such a beverage can be quickly and efficiently prepared. To this end I provide a device whereby a perforated filter, is caused to pass in a downward direction through heated water which has been infused by a mass of ground coffee, or other substance, from which the flavor or soluble portions are to be extracted. The preferred form of the invention is particularly adapted for the preparation of individual drinks directly in a glass or ceramic drinking mug.

Infusion type coffee makers are known. The prior art generally relates to coffee pots in which multiple servings are prepared and subsequently poured into individual mugs or cups for consumption. The process of pouring the coffee or other beverages into a secondary vessel causes noticeable temperature loss and subsequent loss in flavor due to temperature loss. Also, it is often desirable for a person to prepare a single cup of coffee or tea for immediate consumption. The preparation of a larger amount and the use of two vessels instead of one is more difficult and time consuming as well as requiring more effort to clean the vessels after consumption. Simply miniaturizing the conventional plunger type infusion coffee maker to single serving coffee mug size is impractical because the apparatus comprised of a plunger stem, coffee ground holding chamber and filtering disk would interfere with the drinking process There is one example found in prior art which attempts to solve this problem. Manuel De Arrigunaga, of New York, N.Y. in his U.S. Pat. No. 1,346,485 dated July 13, 1920 describes an infusion type coffee maker which is proposed for single serving use in which a person can drink directly from the vessel in which the coffee is prepared. The design is comprised of a cylindrical liquid container which is open at the top, a top cover having a centrally located hole, a piston composed of an upper tubular and lower threaded half, lower and upper perforated metallic disks. The lower metal disk having the threaded piston portion firmly attached is placed at the bottom of the drinking vessel. A single serving amount of coffee grounds or tea is then placed on the metal disk. The second metal disk having a centrally located hole is placed over the coffee grounds or tea and the threaded piston protrudes through the hole in the upper metal disk. The person then screws the upper piston portion onto the lower piston portion, pours hot water into the liquid container and then places the top cover onto the top of the liquid container. Upon completion of these steps the person then pulls the protruding piston rod in an upward direction and then in a downward direction to infuse the coffee or tea into the hot water. The person then unscrews the upper tubular piston rod from the lower threaded piston rod, removes the top lid and is then ready to drink the contents of the liquid container. Although this method produces a good cup of coffee or tea, it uses a considerable number of parts and requires a considerable number of steps in preparing the coffee or tea and in the subsequent cleaning of the parts and therefore is time consuming and inefficient.

SUMMARY OF THE INVENTION

It is an object of the present invention to provide an improved system for the preparation of individual coffee or tea beverages, the contents of which can then be drunk directly from the container in which it was prepared thereby preventing loss of heat which occurs when pouring the hot beverage from one container to another. Another object of the present invention is to provide an improved system for the preparation of individual coffee or tea drinks which is composed of a relatively few parts which are inexpensive to manufacture and easy to clean. A further object of the present invention is to provide an improved system for the preparation of individual coffee or tea drinks which requires only one downward push of the piston rod rather than repeated up and down movements which are time consuming and necessitate the use of a tightly sealed top lid to avoid spillage. A further object of the present invention is to provide an improved system for the preparation of individual coffee or tea drinks which has a push rod which is easily and instantly detachable from the perforated screen which it is pushing. A further object of the present invention is to provide a brewing system inside a drinking container so that after the beverage is brewed, the beverage container and contents therein look substantially like a common coffee mug available on the market today.

Further features and advantages will more fully appear from the detailed description given below, taken in connection with the accompanying drawings which form a part of this specification.

These and other objects are preferably accomplished by providing a beverage preparation device including a single serve liquid container of cylindrical design whose diameter is substantially the same from top to bottom, a plunger assembly consisting of a top cover with a centrally located hole, a perforated disk with a flexible upwardly directed flange which fits against the interior wall of the liquid container, a second more rigid perforated disk having a flexible wire wound flange which fits against the interior wall of the liquid container and a push rod which is permanently mated to the second disk and detachably connected to the first disk at its center. To make a cup of coffee the user simply pours a single serving amount of coffee grounds or tea leaves into the bottom of the liquid container. The person then pours hot water into the liquid container. By use of the push rod which is guided by the hole in the top cover, he or she then presses the first and second perforated disks down through the contents of the liquid container until no further pushing is possible. The person then pulls upwardly on the push rod thereby causing the plunger assembly to detach and remove from the first disk. The first disk remains at the bottom of the container and traps the enclosed coffee grounds or tea leaves between the disk and the bottom of the container. The brewed coffee or tea can now be drunk by the person. When the person finishes the beverage he or she removes the first disk from the bottom of the container and disposes of the coffee grounds or tea leaves. The first disk can then be reattached to the plunger assembly for repeated use.

DESCRIPTION OF THE PREFERRED EMBODIMENT

Figure 1:
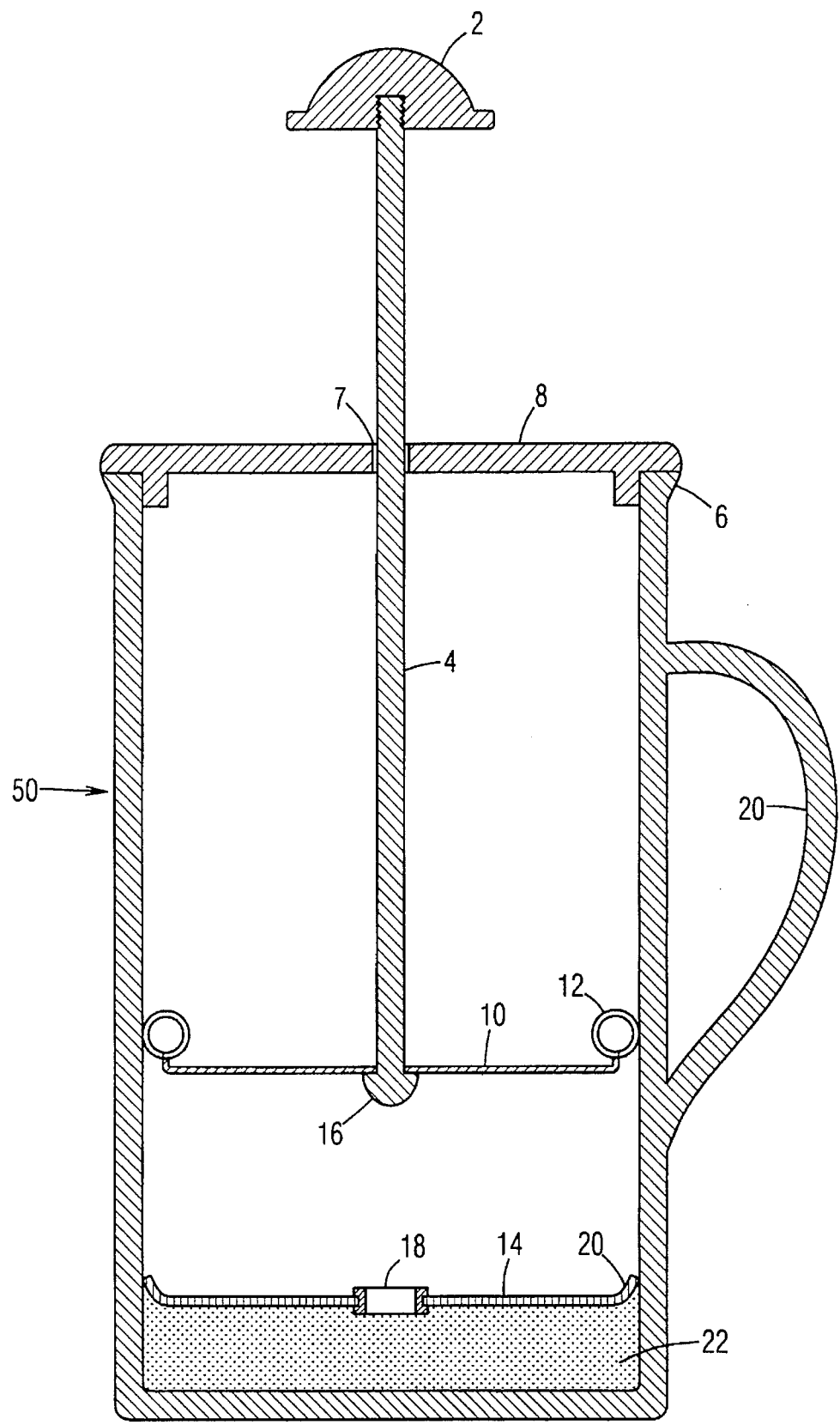
FIG. 1 is a section view of the present invention

Referring to the drawings, FIG. 1 shows all the parts in the improved beverage preparation system of the present invention. Liquid container 6 is sized to contain a single serving of coffee, tea or the like. The liquid container 6 has a handle 20 attached to the side for the purpose of using the container as a drinking cup or mug. Top cover 8 sits on the lip of container 6. The centrally located hole 7 allows a push rod 4 to enter container 6. Hole 7 keeps the push rod 4 centered when the user pushes down on knob 2. Push rod 4 pushes on perforated rigid disk 10 to which it is permanently attached. Compression spring 12 attaches to the perimeter of disk 10 and forms a snug fit with the inner wall of container 6. A second perforated disk or screen 14 is located below rigid disk 10. Disk 10 is detachably connected to disk 14 by means of a ribbed tab 16 located at the center most area and perpendicular to the bottom of disk 10. Resilient ribs on tab 16 insert into a slot 18 formed in disk 14. The ribs on tab 16 are sufficient to hold disk 14 to disk 10 together while the two disks 14, 10 are being pushed down by push rod 4. When push rod 4 and associated disk 10 are removed by the user the flexible flange 20 provides enough spring tension on the inner wall of container 6 that disk 10 remains at the bottom of the container after push rod 4 is pulled out thereby trapping coffee grounds or tea 22 between the bottom of cup 6 and perforated disk 14. Ribs 8 are attached to push rod 4 along its length and extend almost to the inner walls of container 6.

Figures 2, 3:
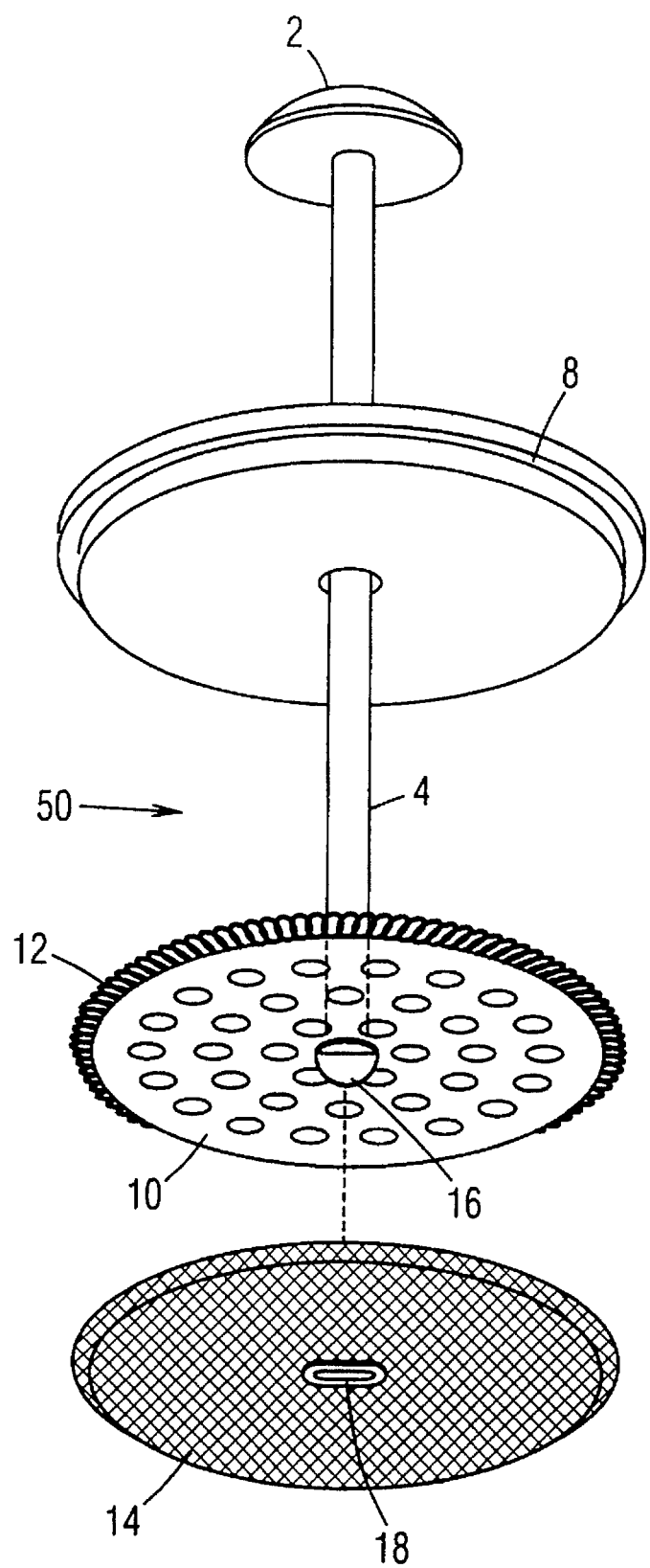
FIG. 2 is a perspective view of the push rod and attached perforated disk
FIG. 3 is a perspective view of a second detachable perforated disk
Figure 4:
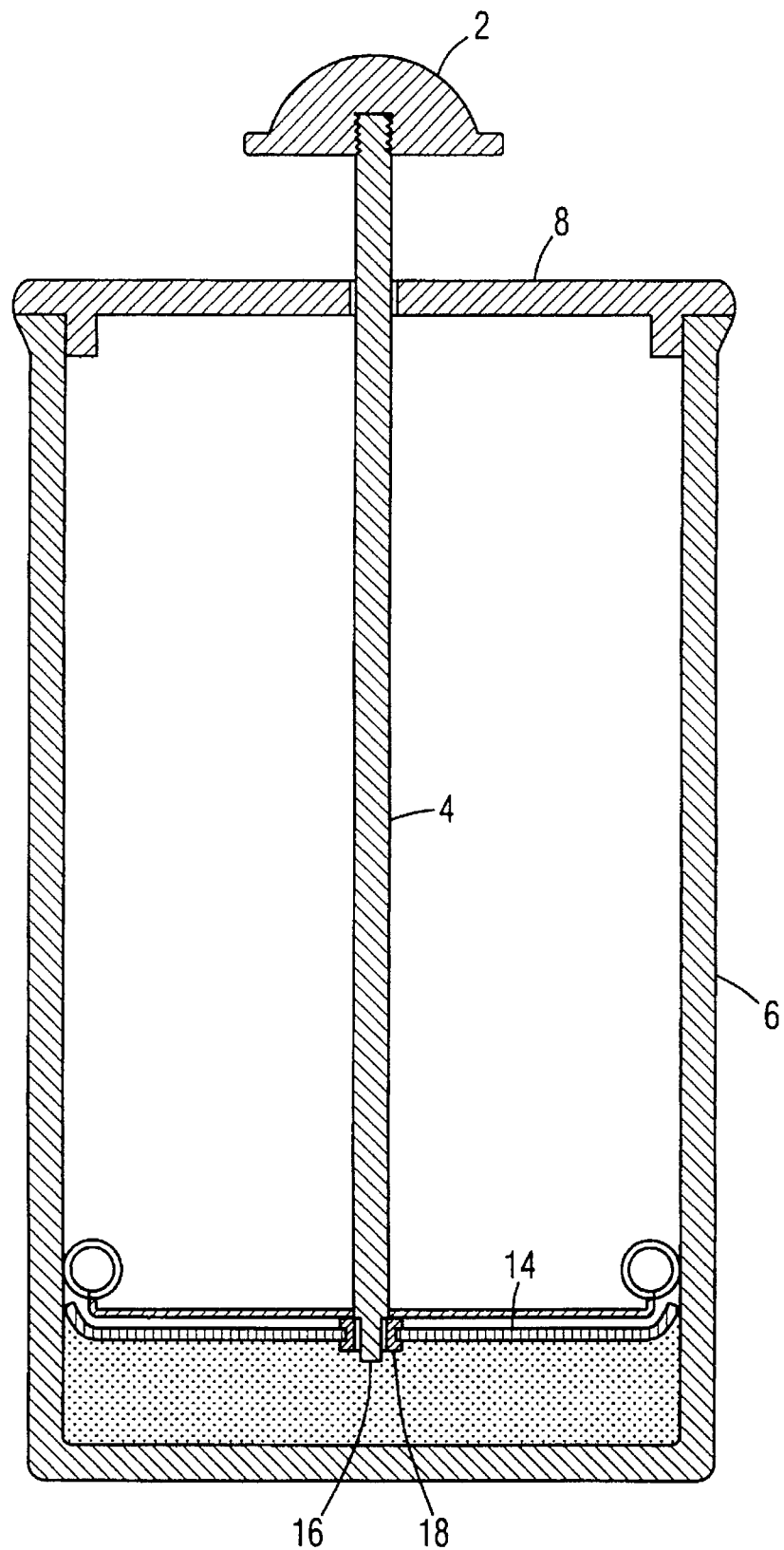
FIG. 4 is a side section view showing the detachable connection between the first disk and the second disk.
Figure 5:
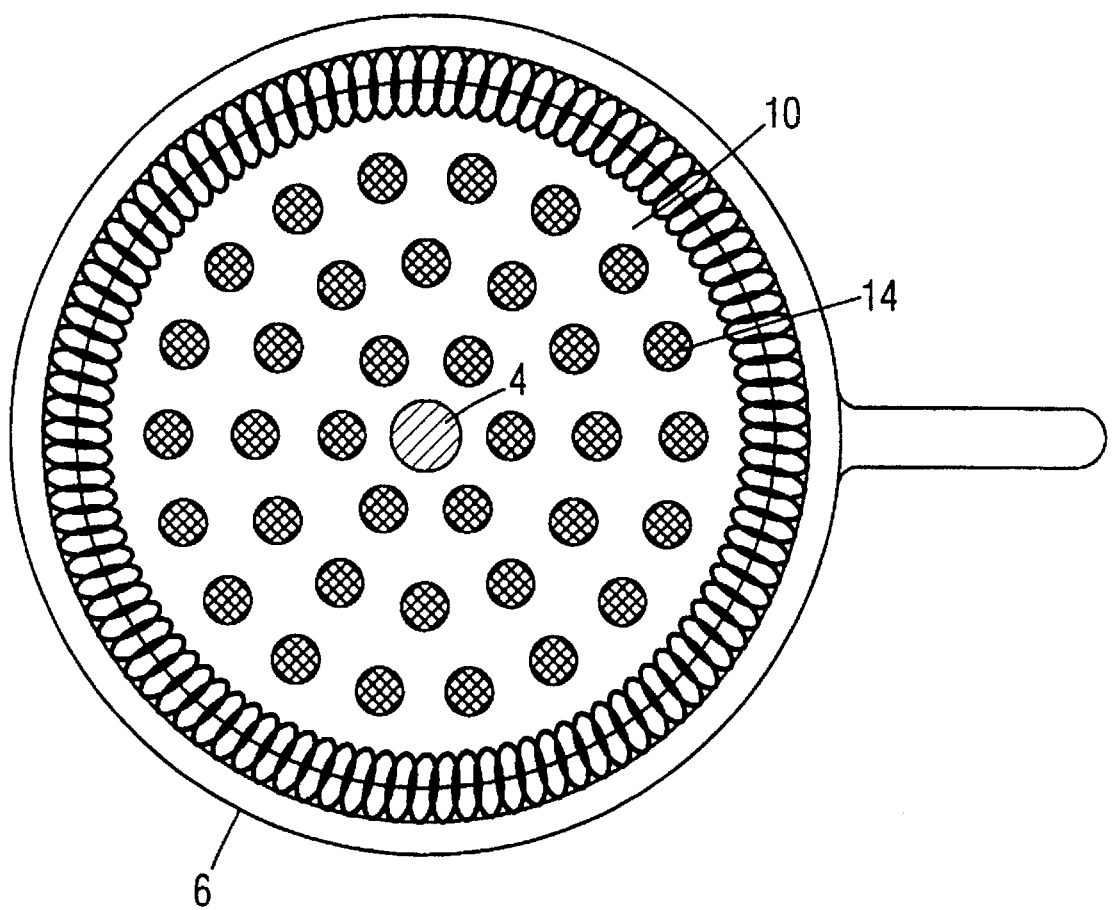
FIG. 5 is a top view of the assembly including push rod, first perforated disk, second perforated disk and liquid container.
Figure 6:
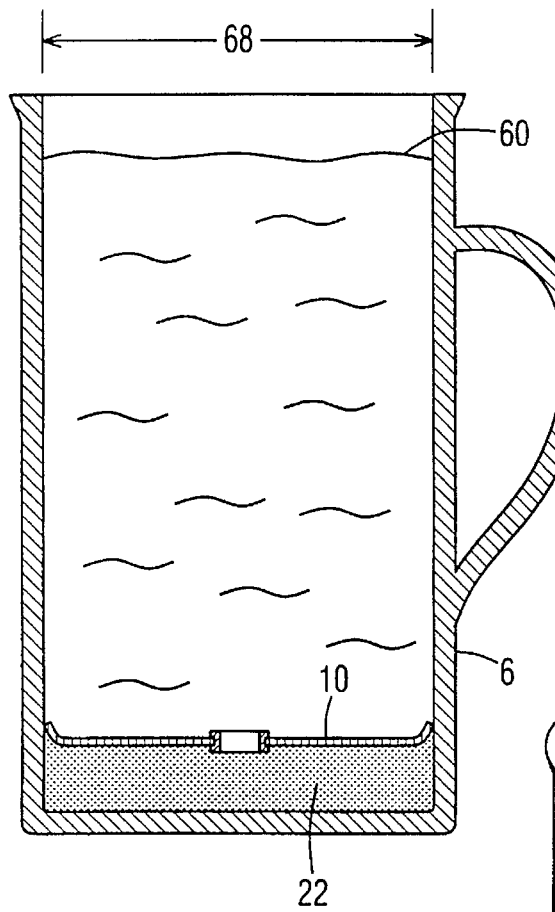
FIG. 6 is a section view of the liquid drinking container showing the coffee grounds trapped between the bottom of the liquid container and the second perforated screen.
Figure 7:
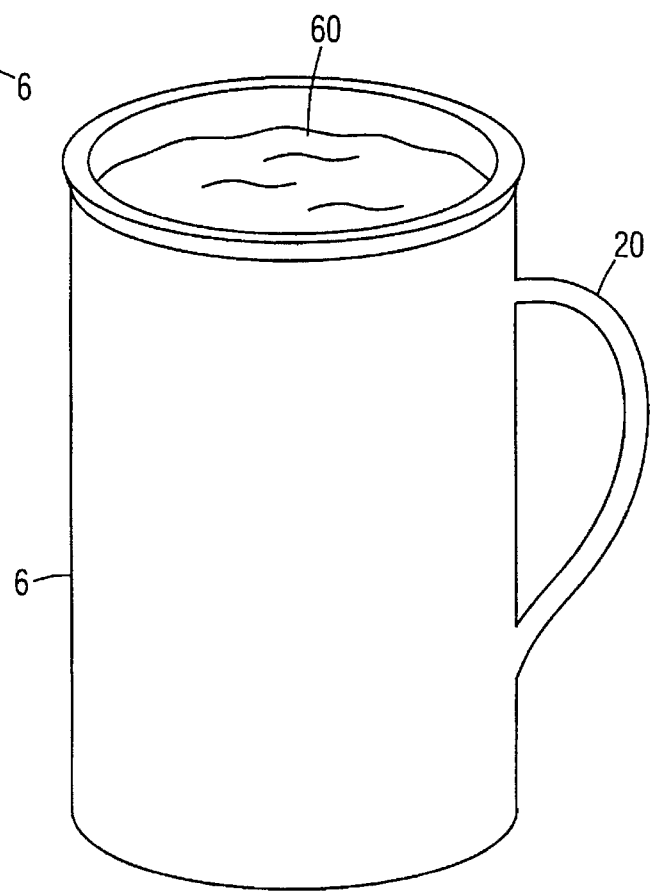
FIG. 7 is a perspective view of the liquid drinking container with the plunger assembly removed and a cup of freshly brewed coffee or tea ready to drink.
Figure 8:
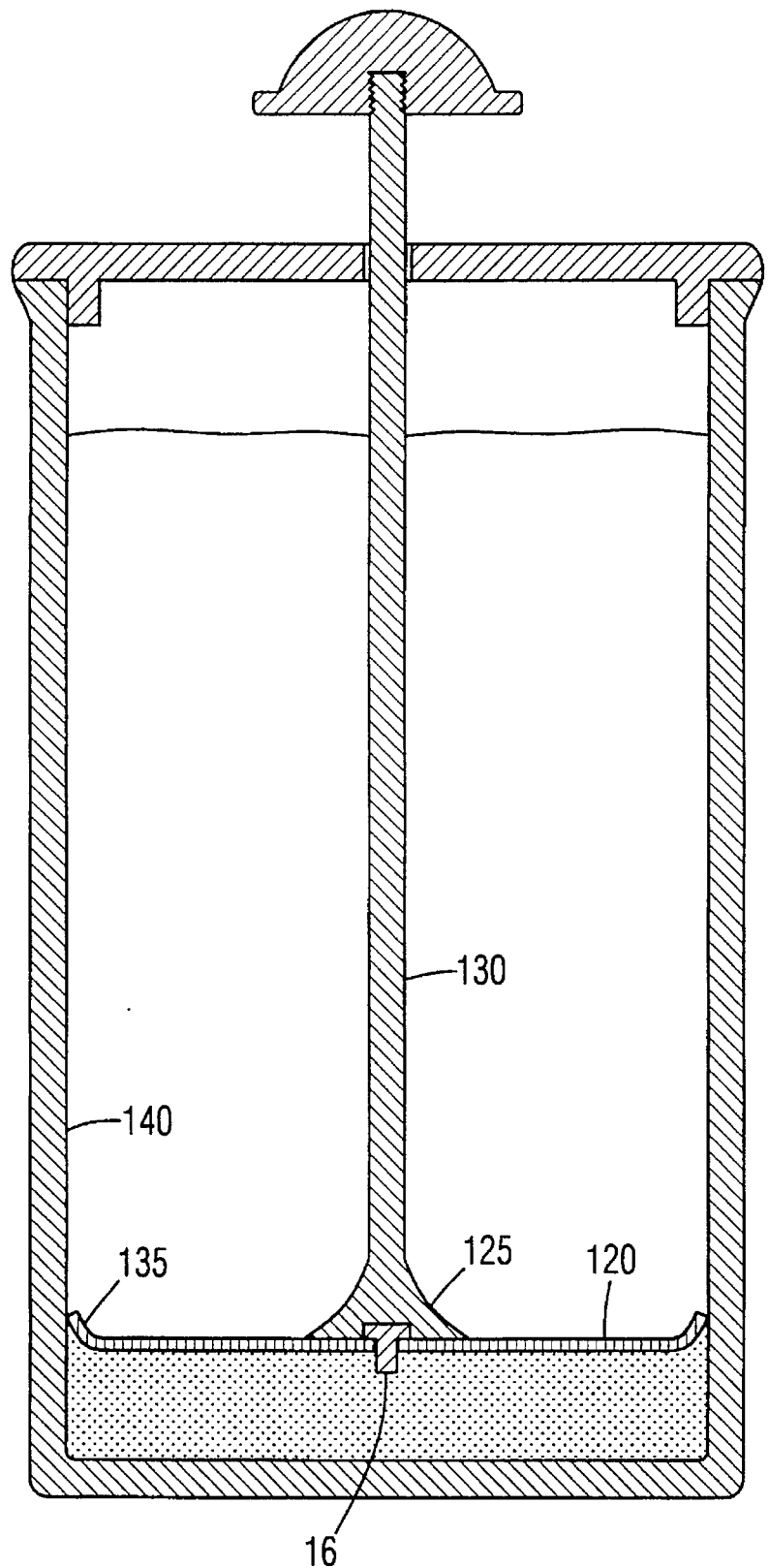
FIG. 8 is a section view of an alternate embodiment of the present invention

FIG. 2 shows plunger assembly 50. Knob 2 is located at the top of push rod 4 making it comfortable for the user to push down with his or her palm and also retaining top lid 8. Top lid 8 is permanently and slidably attached at its center to push rod 4. Perforated rigid disk 10 is permanently attached to the bottom of rod 4. Spring retainer 12 is permanently attached to the perimeter of rigid disk 10. Attachment tab 16 protrudes from the bottom of disk 10. Flexible Perforated or screen disk 14 has a reinforced slot 18 at its center which accepts tab 16. The connection made by tab 16 and slot 18 is such that disk FIG. 3 14 is lightly held onto tab 16 but is removable when the user pulls up on rod 4 thereby causing disk 14 to remain in the drinking container 6. Other methods of lightly holding disk 14 to rod 4 include a magnetic closure, hook and loop fastener, light snap fit or quarter turn bayonet fit. FIG. 4 is a section view where tab 16 resilient ribs are inserted into slot 18 of removable disk 14. An alternative embodiment could have tab 16 be made out of a rigid material and slot 18 made out of a resilient material. FIG. 5 is a top view of the beverage preparation assembly showing perforated disk 10 which is on top of flexible and finely perforated disk 14. The fine perforations in disk 14 preclude any coffee grounds or tea leaves from escaping into the final beverage. FIG. 6 shows the container of the present invention after plunger assembly 50 has been removed. Disk 10 remains in place trapping coffee grounds or the like between the bottom of the drinking container 6 and the underside of disk 10. The inner walls of container 6 are shown as essentially parallel 68. The brewed coffee 60 or other drink is free of particulate matter due to the fine openings in disk 10 which let the brewed coffee through but not the coffee grounds. An alternate embodiment would replace disk 10 with a disposable paper filter disk which is removed along with the used coffee grounds after use. FIG. 7 shows the container 6 filled with a beverage 60. Container 6 has a handle 20 on its side similar to most coffee mugs available on the market today. Therefore the final configuration Of container 6 and the beverage contained therein appears substantially like an ordinary cup of coffee or tea and therefore does not draw unnecessary attention to the inventive brewing method described in this patent application. FIG. 8 shows an alternate embodiment of the present invention wherein plunger rod 130 has a broadened base 125. A resilient member 16 is permanently attached to the bottom central portion of the plunger base 125. A single semi-rigid, finely perforated, plastic molded disk has a centrally located hole the diameter of which is frictionally fitted to resilient member 16. The integral lip 135 of disk 120 is thinner in thickness than the body of the disk so as to be more flexible and forgiving when mating with side wall 140. This configuration can eliminate the need for two separate disks as shown in the main embodiment FIG. 4.

The infusion system is herein described and illustrated using classic materials and design. This presentation demonstrates the method used to isolate the spent grounds in its simplest form. Actual manufacture may use more sophisticated materials and design features. As well this method suggests application to automated functions.

We claim:

1. A system for producing coffee or tea directly in a drinking vessel, comprising:

a drinking vessel having interior side walls and a bottom, a substantially rigid disc with an outer edge having means for fitting closely against the interior side walls of the vessel while permitting up and down sliding movement along the side walls, said disc having perforations, a push rod secured to the substantially rigid disc and extending upwardly sufficiently to extend out of the top of the vessel, with gripping means at the top of the push rod for gripping by a hand of a user, cover means for the drinking vessel, for generally containing liquid from splashing out of the vessel, a second disc sized to fit closely within the interior side walls of the drinking vessel, the second disc being finely perforated such as to pass liquid but substantially to block passage of coffee grounds or tea leaves, and means for temporarily and releasably retaining the second disc immediately below and against the bottom of said substantially rigid disc, said means for retaining being such that the second disc is easily released from the substantially rigid disc upon upward movement of the push rod and substantially rigid disc when immersed in liquid, whereby coffee, tea or other beverages can be brewed directly in the drinking vessel by first placing coffee grounds or tea leaves or other infusible particulate flavoring material in hot water in the vessel to brew the beverage, then placing the substantially rigid disc and push rod down into the vessel with the second disc below, then pressing the push rod down to separate the coffee grounds or tea leaves out of the liquid and to press them firmly down against the bottom of the drinking vessel, and finally by removing the push rod and rigid disc from the vessel, leaving the second disc against the pressed coffee grounds or tea leaves at the bottom of the vessel.

2. The system of claim 1, wherein the cover means comprises a removable cover for the drinking vessel, adapted to fit over the top of the vessel, the cover having an opening through which the push rod extends for sliding movement relative to the cover.

3. The system of claim 1, wherein the means for temporarily and releasably retaining comprises an opening located generally centrally in the second disc and a protrusion or tab extending downwardly from the bottom of the push rod and sized to fit closely into the opening in the second disc so as to temporarily retain the second disc to the bottom end of the push rod.

4. The system of claim 1, wherein the second disc comprises a flexible filter paper disc, and wherein said means for temporarily and releasably retaining the second disc comprises surface contact and pressure acting between the second disc and the bottom of the substantially rigid disc when the two discs are immersed in liquid and the push rod is pushed downwardly.

5. A method for producing coffee, or tea from infusible particulate material directly in a drinking vessel, comprising:

placing into a drinking vessel hot water and coffee grounds, tea leaves or other infusible particulate material for making a beverage, placing down into the vessel a substantially rigid first disc with an outer edge having means for fitting closely against the interior walls of the vessel, said disc having perforations, and with a second disc positioned below the substantially rigid first disc, the second disc being sized to fit closely within the interior walls of the drinking vessel and being finely perforated such as to pass liquid but substantially to block passage of coffee grounds or tea leaves, pressing the substantially rigid first disc down into the liquid in the vessel with the second disc immediately below, and continuing to push the two discs down through the liquid to separate the coffee grounds or tea leaves out of the liquid and to press them firmly down against the bottom of the drinking vessel, and removing the first disc from the vessel while leaving the second disc against the pressed coffee grounds or tea leaves at the bottom of the vessel for drinking of the beverage.

6. The method of claim 5, further including covering the drinking vessel while pressing the first disc down into the vessel and while removing the first disc, to prevent splashing of liquid out of the vessel.

7. The method of claim 5, wherein the second disc is secured mechanically and releasably to the bottom of the first disc before the first and second discs are pressed down into the liquid.

8. The method of claim 7, wherein the mechanical securement of the first disc to the second disc is made by pressing a tab at the bottom the first disc into a slot of the second disc.

9. The method of claim 5, wherein the second disc comprises a paper filter, and the method including placing the second disc in the vessel, on top of the liquid, then placing the first disc down into the vessel against the second disc for pressing of the discs down into the liquid.

10. The method of claim 9, wherein the step of pressing the first disc down into the liquid comprises pushing down on a plunger or push rod which is secured rigidly to and extends upwardly from the first disc.

11. The method of claim 5, wherein the step of pressing the first disc down into the liquid comprises pushing down on a plunger or push rod which is engaged with and extends upwardly from the first disc.

12. A method for producing coffee, or tea from infusible particulate material directly in a drinking vessel, comprising:

placing into a drinking vessel hot water and coffee grounds, tea leaves for making a beverage, placing down into the vessel an imperforate disc with an outer edge fitted closely to the interior walls of the vessel, pressing the imperforate disc downwardly through the liquid to separate the coffee grounds or tea leaves out of the liquid and to press them firmly down against the bottom of the drinking vessel, and leaving the imperforate disc against the pressed coffee grounds or tea leaves at the bottom of the vessel while drinking the beverage.

13. The method of claim 12, wherein the step of pressing the disc down through the liquid comprises using a push rod having a disc engaging surface at its lower end to push the imperforate disc down with generally evenly applied pressure across the disc until it compresses the coffee grounds or tea leaves against the bottom of the drinking vessel.

14. The method of claim 13, wherein the imperforate disc comprises a porous paper filter.

15. An apparatus comprising:

a. a drinking vessel having an interior wall and a bottom;

b. an imperforate disc with an outer edge for fitting closely to the interior wall; and c. a rod configured for releasably coupling to the imperforate disc for pressing the imperforate disc against the bottom such that the rod can be detached from the imperforate disc and the thereby leave the imperforate disc against the bottom.

16. The apparatus of claim 15, further comprising a cover means for the drinking vessel to prevent a beverage inside the drinking vessel from splashing.

17. The apparatus of claim 15, further comprising a gripping means connected to the rod located distally from the imperforate disc.

18. A method of producing a coffee or tea beverage in a drinking container comprising the steps of:

a. holding a liquid mixture, composed of a plurality of coffee grounds or a plurality of tea leaves with an amount of water, in the drinking container with a bottom;

b. filtering the coffee grounds or the tea leaves from the mixture by pushing the coffee grounds or the tea leaves to the bottom of the container by using a filtering disc;

c. keeping the coffee grounds or the tea leaves confined to the bottom of the container by pressing the filtering disc against the coffee grounds or tea leaves, wherein the coffee grounds or the tea leaves are between the filtering disc and the bottom, thereby forming the coffee or tea beverage which can be consumed directly from the drinking container.

19. The method as claimed in claim 18, wherein the container includes a cover for preventing the mixture from splashing outside the container.

* * * * *